Jan. 16, 1968     S. M. KRINOV     3,363,980
MIXING CONTROL DURING METAL AND METALLOID OXIDE PRODUCTION
Filed March 29, 1965     2 Sheets-Sheet 1

STANLEY M. KRINOV
*INVENTOR.*

STANLEY M. KRINOV
INVENTOR.

United States Patent Office 3,363,980
Patented Jan. 16, 1968

3,363,980
MIXING CONTROL DURING METAL AND METALLOID OXIDE PRODUCTION
Stanley M. Krinov, Lexington, Mass., assignor to Cabot Corporation, Boston, Mass., a corporation of Delaware
Filed Mar. 29, 1965, Ser. No. 443,388
5 Claims. (Cl. 23—202)

ABSTRACT OF THE DISCLOSURE

The present invention relates to a method and apparatus for controlling the extent of mixing of vaporous reactant streams entering a metal or metalloid oxide producing reaction zone. Broadly, said method comprises providing a mixing zone upstream from said reaction zone, disposing within said mixing zone a continuously adjustable turbulence producing means, and controlling the extent of mixing of the reactant streams irrespective of the flow rates thereof by adjusting said turbulence producing means.

---

The manufacture of metal and metalloid oxides such as titanium dioxide, silicon dioxide, zirconium dioxide and the like by pyrogenic processes wherein a metal compound in vapor form is oxidized and/or hydrolyzed at elevated temperatures with the aid of a free oxygen-containing gas to produce the corresponding metal oxide is well known. In typical processes of this type, a metal compound is reacted with a free oxygen-containing gas as illustrated in the following equation:

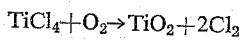

Since such reactions are normally not selfsustaining, auxiliary heat is frequently provided to the reaction such as by preheating the reactants and/or reaction zone. Said auxiliary heat can be produced, for instance, by reacting a fuel gas with a free oxygen-containing gas as illustrated in the following equation:

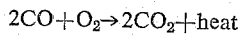

It is of the utmost importance, in order to maintain product quality and uniformity, that the reaction(s) in such processes be accomplished under precisely controlled conditions of temperature, concentration and pressure. In addition, it is necessary that mixing of the reactants be achieved uniformly and controllably.

One of the more serious problems encountered in the production of metal oxides by pyrogenic processes resides in the difficulty of providing at different throughputs while utilizing a given burner, a controlled and uniform mixture of the reactants. Improper mixing can cause a significant disturbance in the rate and uniformity of reaction resulting in a metal oxide product of poor uniformity and quality.

In accordance with this invention, however, the problems arising from non-uniform or uncontrolled mixing of the reactants have been virtually eliminated.

A principal object of the present invention is to provide an improved process for the production of pyrogenic metal oxides.

It is another object of the present invention to provide an improved process for the production of pyrogenic titanium dioxide.

It is another object to provide improved apparatus for the production of pyrogenic metal oxides wherein uniform and controlled mixture of gaseous reactants from a given burner at different throughputs can be readily achieved.

Other objects of the present invention will in part be obvious and will in part appear hereinafter.

In accordance with the present invention, it was discovered that control and uniformity of the mixture of reactants within a metal oxide producing zone and thus the quality of the metal oxide product formed can be substantially improved by providing at or near the entry point of said reactants into the reaction zone, controllable speed rotor means.

The above and other objects and advantages of the present inventoin will be more readily understood when reference is had to the accompanying drawings forming part hereof wherein.

Figure 1:
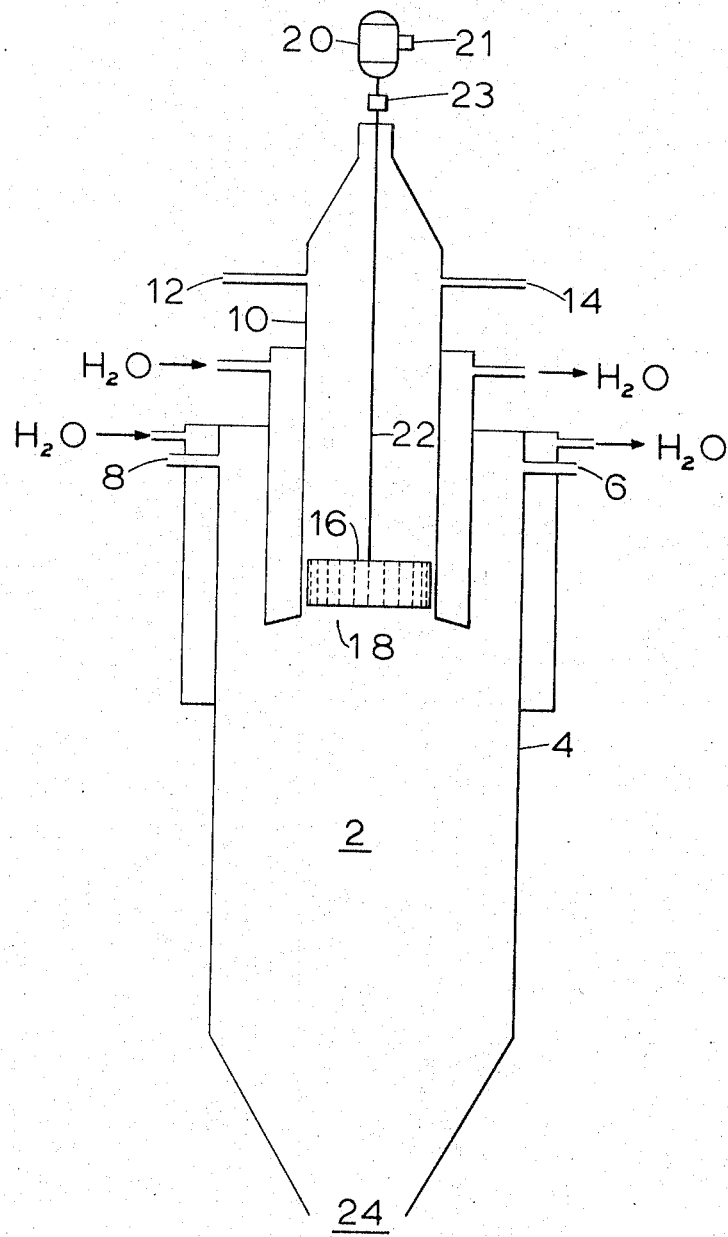
FIGURE 1 is a schematic diagrammatic longitudinal view of apparatus of the general type that can be utilized in accordance with the present invention in which reactant gases are controllably and uniformly mixed by turbulence created by a controllable speed rotor means located at or near the entry point of the various reactants into the reactor.
Figure 4:
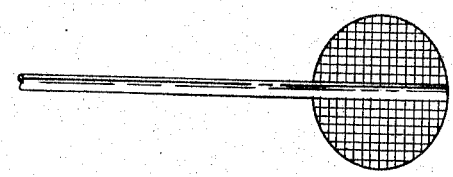
FIGURES 2, 3 and 4 are schematic diagrammatic side views of diverse embodiments of the controllable speed rotor means of the present invention.
Figure 3:
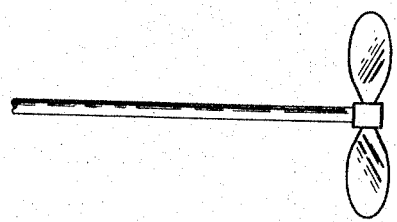
Figure 2:
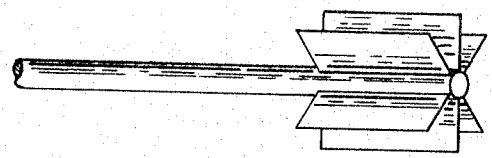

In a typical run referring now to FIGURE 1, reaction zone 2 in reactor 4 is preheated by the introduction of oxygen through inlet 6 and a fuel gas such as carbon monoxide through inlet 8 which are ignited within reactor 4. The temperature is controlled within zone 2 by regulating the flow of carbon monoxide and/or oxygen. After sufficient preheating of zone 2, the metal oxide-forming reactants, i.e. a metal compound in vapor form and additional free oxygen-containing gas as well as any other ingredients desired are introduced into the reaction zone through water cooled injection column 10 by means of inlets 12 and 14 respectively. After the metal oxide producing reaction has been established, the amount of fuel gas and associated free oxygen-containing gas charged into the reactor is normally reduced. The mixing of metal compound vapors, oxygen and any other reactants introduced into zone 2 at various rates is controlled by the utilization of a controllable speed rotor means. More specifically, as illustrated, paddle wheel rotor 16 positioned near entry point 18 is rotated by motor 20 acting through shaft 22 and creates a controlled turbulence of the reactant gases thereby mixing the reactants to the desired degree. The extent of mixing is controlled by (a) varying the rotational speed of rotor 16 such as by control of the motor speed through speed control means 21, (b) by maintaining the rotation of rotor 16 substantially constant while increasing or decreasing the flow of reactants or (c) by altering both the speed of rotation and the flow of reactants. The metal oxide produced flows out of the reactor through outlet 24 and is collected by any suitable method.

The materials from which the controllable speed mixing rotors of the present invention are fabricated are subject to considerable variation. Thus, any material such as various metals, metal alloys and ceramic compositions which is substantially inert with respect to the reactants and products of reaction at the temperatures encountered during operations is generally suitable. More specifically, materials that have been found to be generally suitable for the purposes of the present invention are aluminum, stainless steel, nickel, vitreous silica, porcelain and the like.

Obviously, the design, size and other parameters of the apparatus of the present invention are also variable. However, it should be noted that determination of design specifications, e g., such as rotor design, shaft diameter and specific motor means, and the like, are to some extent dependent upon the particular reaction to be achieved and the particular metal oxide to be produced. As mentioned hereinbefore, the controllable speed rotor means, as shown in FIGURES 1–4 can be cooled by any appropriate means such as internal liquid cooling, if desired.

Moreover, any suitable speed control mechanism can regulate the rotational speed of the rotor means. For example, when an electric motor is employed to drive said rotor means, control of rotor speed can readily be achieved by means of a rheostat. When said rotor means is driven by a compressed air motor, the speed of the rotor means can be regulated by controlling the air pressure to said motor. Moreover, a rotational speed measuring device such as a tachometer or stroboscopic apparatus can be utilized to monitor the speed of rotation.

It should be noted that in some cases, depending upon the design of rotor 16, the flow of gases rushing past rotor 16 can cause relatively rapid rotation of said rotor. In this case, control of mixing can also be accomplished by hindering the rotation of said rotor by an suitable means such as by providing pressure controlled braking shoes surrounding the rotor shaft, or the like. Needless to say, the rotor means can be readily designed so that it will not rotate despite the rapid flow of gases thereby.

In short, the specific materials of construction, the specific design or dimensions of a particular rotor means to be utilized in conjunction with a particular metal oxide producing process are subject to a number of variables which variables, however, should present no obstacle to one skilled in the art and armed with the above information.

Any metallic compound which has a substantial vapor pressure at temperatures up to about 800° F. is generally suitable as a feedstock for the purposes of producing a metal oxide in accordance with the present invention. More specifically, metal halides and/or oxyhalides such as titanium tetrachloride, silicon tetrachloride, zirconium tetrachloride, titanium oxychloride and mixtures thereof are entirely suitable. However, the halides of said metals are preferred. The metal compound in vapor form can be introduced by itself or in combination with any other reactants or inert gases utilized in producing the metal oxide.

Generally, any free oxygen-containing gas can be used in accordance with the present invention. However, oxygen or air are the preferred gases. Moreover, the free oxygen-containing gas can be introduced into the reaction zone separately or in combination with any of the other gases.

As mentioned hereinbefore, the metal or metalloid oxide forming reaction often does not generate sufficient heat to be self-sustaining. Therefore, the reaction zone is usually preheated and/or a supply of heat is provided in order to maintain temperatures in the reaction zone which will result in a sustained metal oxide-producing process. In this connection, the reaction of any fuel gas such as carbon monoxide, methane or butane and a free oxygen-containing gas such as hereinbefore described can be used for preheating and/or supplying heat to the reaction zone and/or the reactants. Preferably, however, carbon monoxide is utilized because it is relatively readily available and because in producing titanium dioxide by the oxidation of titanium tetrachloride, it is generally desirable that fuel gases containing substantial quantities of hydrogen be avoided or utilized only in limited quantities.

The advantages of the present invention are more specifically disclosed in the following illustrative examples which should not be construed as restricting the scope of the present invention.

EXAMPLE 1

The apparatus utilized in this example comprises an annular reaction chamber of the type illustrated in FIGURE 1 comprising water cooled aluminum injection column 10 which has an I.D. of 2 inches, and stainless steel controllable speed rotor 16 (of the type illustrated in FIGURE 2) actuated by a compressed air motor 20, the speed of which is controlled by regulating the pressure of the air supply thereto through pressure regulator 21. The speed of rotor 16 is measured by tachometer 23. In this example, rotor 16 is not actuated. Oxygen and carbon monoxide at a rate of about 10,000 s.c.f.h. each are introduced through inlets 6 and 8 respectively. The resulting mixture is ignited, and after reaction zone 2 has been preheated to a temperature of about 1800° F., about 4,000 s.c.f.h. titanium tetrachloride vapor at a temperature of about 250° F. and about 10,000 s.c.f.h. oxygen are introduced into reactor 4 through column 10 by means of conduits 12 and 14 respectively. The resulting titanium dioxide-producing reaction is allowed to continue for 24 hours after which samples of the product are carefully examined. It is found that 20,000 lbs. of titanium dioxide having a size distribution between about 50 and about 700 millimicrons has been produced. It is further found that about 20% by number of the particles have particle diameters below about 100 or above about 500 millimicrons. Said particle size distribution is generally considered by those skilled in the art as entirely too broad to constitute a quality pigment.

EXAMPLE 2

This example is a duplicate of Example 1 except that rotor 16 is actuated by compressed air motor 20 and rotates at about 300 r.p.m. during the entire operation. After 24 hours of operation, the titanium dioxide produced is carefully examined. It is found that 20,000 lbs. of titanium dioxide having a particle size distribution between about 50 and 700 millimicrons has been produced. However, in this example it is found that only about 3% by number of said particles have diameters below about 100 or above about 500 millimicrons.

EXAMPLE 3

This example is a duplicate of Example 1 with the exception that controllable speed rotor 16 is actuated and rotates during the entire operation at about 800 r.p.m. After 24 hours, 20,000 lbs. of titanium oxide are produced which have a particle size distribution between about 75 and 400 millimicrons. Moreover, less than about 1% of the particles have diameters below about 100 or above about 500 millimicrons.

Obviously, many changes can be made in the above examples and drawings without departing from the scope of the present invention. For instance, various designs of the rotor means can be utilized such as those shown in FIGURES 2–4.

Also, it is entirely suitable for each of the reactants and the fuel gas(es) to be conveyed into column 10 through a single inlet means. Thus, although in the above examples, oxygen and titanium tetrachloride are charged into column 10 through separate conduits, a common conduit can also be utilized.

Moreover, other fuel gases can be used either in combination or separately although it should be borne in mind that the use of hydrogen containing fuel gases is not generally desirable where pigment grade titanium dioxide is the product to be produced.

Moreover, when it is desirable that the reactants entering the burner be diluted without greatly disturbing the mass flow rates of the gases, said reactants can be diluted with an inert gas, such as nitrogen or helium prior to or during the charging of said reactants to the burner. Thus, it is possible to retain a given mass flow rate while reducing the flow of reactants and/or fuel gases.

Further, although the above examples relate only to the production of pigment grade titanium dioxide, obviously other metal and metalloid oxides such as silicon dioxide, zirconium dioxide, iron oxide and mixtures thereof can also be produced in accordance with the present invention.

Accordingly, it is intended that the above disclosure be regarded as illustrative and as in no way limiting the scope of the invention.

What I claim is:

1. In a process for producing pyrogenic oxides of metals or metalloids by reacting, in an enclosed reaction zone maintained at temperatures above about 800° F., continuous streams comprising (1) a free-oxygen containing gas and (2) vapors of a suitably reactive compound of such a metal or metalloid, the improvement which comprises flowing said streams into a mixing zone upstream from said reaction zone, subjecting said streams while flowing through said mixing zone to the high intensity turbulence created by an externally actuated and controlled rotor rotating about an axis substantially aligned with the flow direction of said streams and adjusting the speed of said rotor so as to achieve uniform mixing of said streams independent of the exact flow rates thereof.

2. The process of claim 1 wherein at least part of said mixing zone is cooled.

3. The process of claim 1 wherein said compound is titanium tetrachloride.

4. The process of claim 1 wherein said free oxygen-containing gas is air.

5. The process of claim 1 wherein said free oxygen-containing gas is oxygen.

References Cited

UNITED STATES PATENTS

| 3,086,851 | 4/1963 | Wagner | 23—277 |
| 2,819,151 | 1/1958 | Flemmert | 23—153 X |
| 2,823,982 | 2/1958 | Saladin et al. | 23—202 |
| 3,275,412 | 9/1966 | Skrivan | 23—202 |

FOREIGN PATENTS

| 655,647 | 7/1951 | Great Britain. |

MILTON WEISSMAN, *Primary Examiner.*

EDWARD STERN, *Examiner.*